US010763971B2

(12) United States Patent
Esman et al.

(10) Patent No.: US 10,763,971 B2
(45) Date of Patent: Sep. 1, 2020

(54) COMB ASSISTED SPREAD-SPECTRUM RECEIVER AND RECEPTION METHODS

(71) Applicant: The Regents of the University of California, Oakland, CA (US)

(72) Inventors: Daniel Esman, San Diego, CA (US); Vahid Ataie, San Diego, CA (US); Ping P. Kuo, San Diego, CA (US); Nikola Alic, La Jolla, CA (US); Stojan Radic, San Diego, CA (US)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 16/079,005

(22) PCT Filed: Feb. 24, 2017

(86) PCT No.: PCT/US2017/019317
§ 371 (c)(1),
(2) Date: Aug. 22, 2018

(87) PCT Pub. No.: WO2017/147397
PCT Pub. Date: Aug. 31, 2017

(65) Prior Publication Data
US 2019/0052367 A1    Feb. 14, 2019

Related U.S. Application Data

(60) Provisional application No. 62/300,329, filed on Feb. 26, 2016.

(51) Int. Cl.
| H04B 10/00 | (2013.01) |
| H04B 10/61 | (2013.01) |
| H04B 10/90 | (2013.01) |
| G01J 3/28 | (2006.01) |

(Continued)

(52) U.S. Cl.
CPC .............. *H04B 10/616* (2013.01); *G01J 3/28* (2013.01); *H04B 1/69* (2013.01); *H04B 10/532* (2013.01);
(Continued)

(58) Field of Classification Search
CPC .... H04B 10/616; H04B 10/532; H04B 10/90; H04B 1/69; H04B 2210/006; G01J 3/28
(Continued)

(56) References Cited

U.S. PATENT DOCUMENTS 9,287,993 B1    3/2016    Adleman et al.
9,625,351 B2    4/2017    Ataie et al.
(Continued)

OTHER PUBLICATIONS

Shane Thomas, International Search Report for Application No. PCT/US2017/019317, dated Jun. 28, 2017.
(Continued)

*Primary Examiner* — Mohammad R Sedighian
(74) *Attorney, Agent, or Firm* — Greer, Burns & Crain, Ltd.; Steven P. Fallon

(57) ABSTRACT

A spread spectrum receiver and receiving methods are provided. Received data is physically reconstructed in the optical domain using a pair of coherently coupled frequency combs, one modulated by the received signal and one modulated by the code word, and then detecting the received data with a subrate detector comprised of detector array. Particular methods and receivers extract a timing difference between the received spread spectrum signal and the codeword from the phase shifts of Fourier terms of the product of the received spread spectrum signal and the codeword that can be measured from the combined combs.

18 Claims, 12 Drawing Sheets

(51) Int. Cl.
*H04B 1/69* (2011.01)
*H04B 10/532* (2013.01)

(52) U.S. Cl.
CPC ....... *H04B 10/90* (2013.01); *H04B 2210/006* (2013.01)

(58) Field of Classification Search
USPC ........................................................ 398/115
See application file for complete search history.

(56) References Cited

U.S. PATENT DOCUMENTS

| | | | |
|---|---|---|---|
| 2003/0058957 | A1 | 3/2003 | Fling et al. |
| 2010/0103413 | A1 | 4/2010 | Gohle et al. |
| 2012/0163501 | A1* | 6/2012 | Dong .................. H04L 27/2096 375/300 |
| 2012/0236314 | A1 | 9/2012 | Fermann et al. |
| 2014/0253915 | A1 | 9/2014 | Ataie et al. |
| 2014/0254619 | A1 | 9/2014 | Ataie et al. |
| 2017/0180054 | A1* | 6/2017 | Kiuchi .................... H04B 10/90 |

OTHER PUBLICATIONS

Ataie et al., "Spectrally Equalized Frequency Comb Generation in Multistage Parametric Mixer With Nonlinear Pulse Shaping", Journal of Lightwave Technology, vol. 32, No. 4, pp. 840-846, Feb. 15, 2014.

Choi et al., "Performance of Ultra-Wideband Communications With Suboptimal Receivers in Multipath Channels", IEEE Journal on Selected Areas in Communications, vol. 20, No. 9, pp. 1754-1766, Dec. 2002.

Ferain et al., "Multigate transistors as the future of classical metal-oxide-semiconductor field-effect transistors", Nature, vol. 479, pp. 310-316, Nov. 17, 2011.

Hilbert et al., "The World's Technological Capacity to Store, Communicate, and Compute Information", Science, vol. 332, pp. 60-65, Apr. 1, 2011.

Jeon et al., "Energy-Optimized High Performance FFT Processor", Acoustics, Speech and Signal Processing (ICASSP), 2011 IEEE International Conference, pp. 1701-1704, May 2011.

Mitchell, "Broad is the way", IEEE Review, pp. 35-39, Jan. 2001.

Rife et al., "Single-Tone Parameter Estimation from Discrete-Time Observations", IEEE Transactions on Information Theory, vol. IT-20, No. 5, pp. 591-598, Sep. 1974.

Tang et al., "A 2.4-GS/s FFT Processor for OFDM-Based WPAN Applications", IEEE Transactions on Circuits and Systems—II: Express Briefs, vol. 57, No. 6, pp. 451-455, Jun. 2010.

* cited by examiner

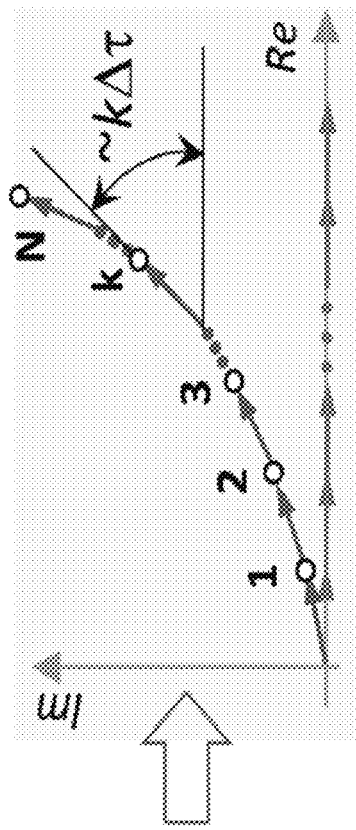
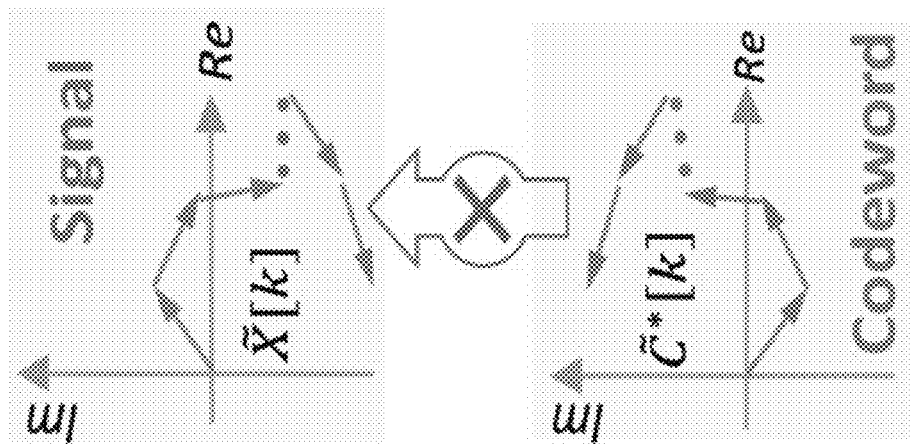
FIG. 2A

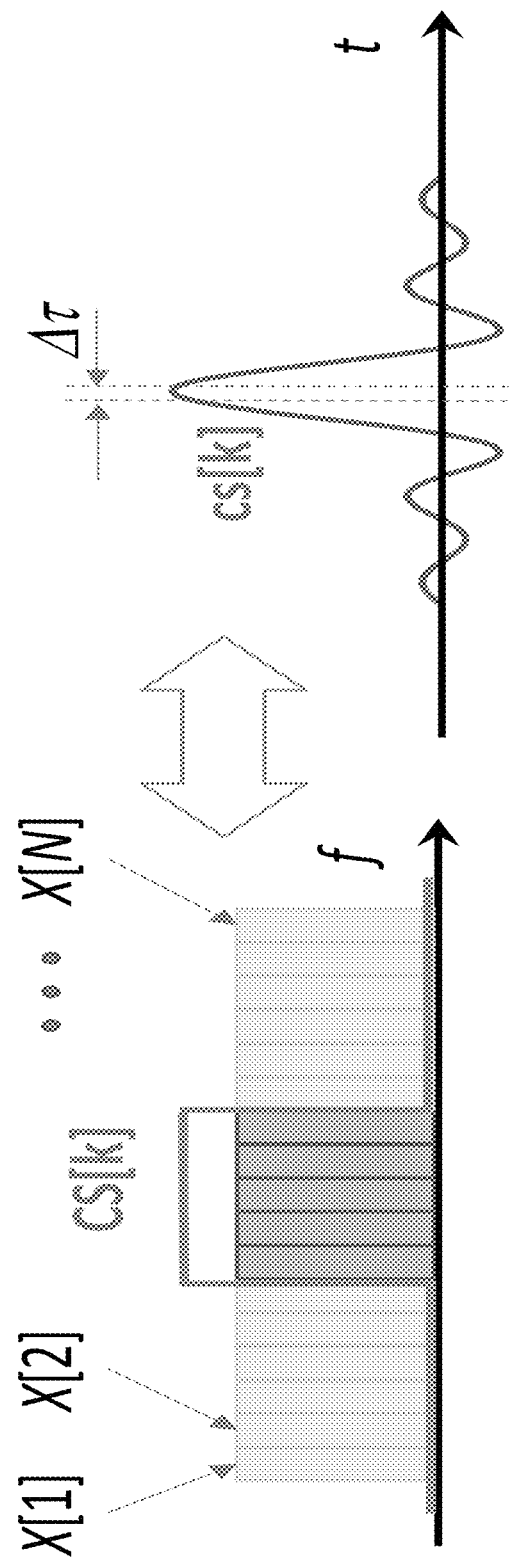

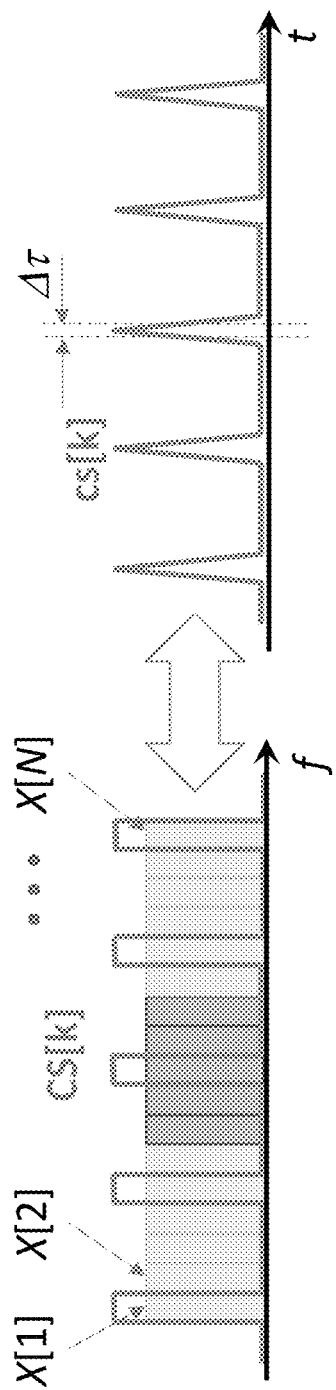
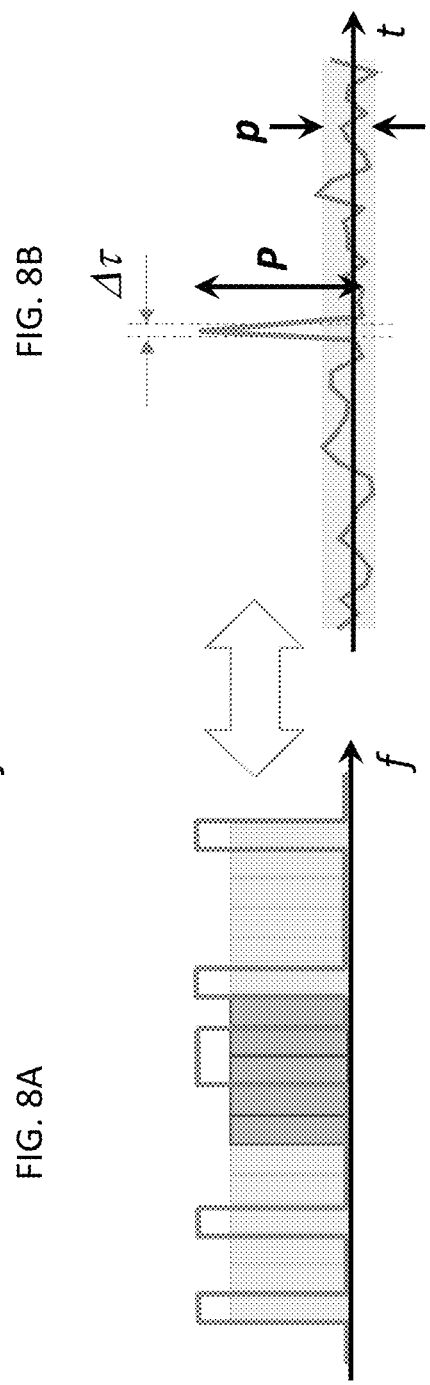
FIG. 8A
FIG. 8B
FIG. 8C
FIG. 8D

COMB ASSISTED SPREAD-SPECTRUM RECEIVER AND RECEPTION METHODS

PRIORITY CLAIM AND REFERENCE TO RELATED APPLICATION

The application claims priority under 35 U.S.C. § 119 and all applicable statutes and treaties from prior U.S. provisional application Ser. No. 62/300,329, which was filed Feb. 26, 2016.

FIELD

A field of the invention is wireless communications. A particular application of the invention is in wireless receivers. Cellular networks would benefit greatly, for example, from the present invention.

BACKGROUND

Wireless receivers in mobile devices rely upon mobile connections that consist of strictly regulated, narrow RF bands. Band allocation minimizes interference but also mandates that the entire commercial (Continental US) cellular traffic occupies less than a GHz. This provides high mobility, but one penalty for the unrestricted mobility of mobile devices is paid in terms of low connectivity: while a single wired rate now exceeds 10 Gbps, the entire cellular network is confined to only 765 MHz. Remarkably, the modern mobile network must accommodate all of its users within the spectral range that is orders of magnitude narrower than that of a single physical wireline.

The available radio frequency (RF) spectrum is scarce and is tightly regulated to avoid interference issues. High speed and reliable data transmission communications must be enabled while avoiding interference and adhering to strictly regulated spectral windows allocated for cellular, military, navigation and broadcast services. The strict band allocations minimize interference but less than a GHz wide band available for cellular data traffic. The spectral range allocated such traffic is four orders of magnitude narrower than that of a single physical wireline. Hilbert, M., & López, P., "The world's technological capacity to store, communicate, and compute information," Science, 332(6025), 60-65 (2011). To transmit freely across the entire RF range, signal spectral power density (SPD) must be decreased below the band-specific interference threshold. A method to achieve arbitrarily low SPD is spectral spreading of the channel. Such spectral spreading makes signal reception and reconstruction a processing challenge, which is addressed with increased processing power in modern portable devices. See, e.g., Mitchell, T., "Broad is the way: ultra-wideband technology," IEEE Review, 47(1), 35-39 (2001); Ferrain, I., et al., "Multigate transistors as the future of classical metal-oxide-semiconductor field-effect transistors," Nature 479, 310-316 (2011). The normal approach is to digitize the ultrawideband signal and compute its correlation with the spreading sequence.

In a spread-spectrum channel, data is rapidly modulated by a specific sequence (codeword) to produce a waveform with much wider bandwidth. By spreading the signal over a wide bandwidth, the SPD in each frequency is greatly reduced. The spreading also reduces the effects of interference and can provide security, as well. Intuitively, SPD can be arbitrarily lowered by a mere increase in code rate, implying that a regulation-free transmission across the entire RF range can be attained. As an illustration, to reduce SPD of a MHz-wide channel by 10,000 times, its physical bandwidth should be increased to 10 GHz. While multi-GHz modulation is easily accomplished, the reconstruction (decoding) of 10 GHz-wide spread-spectrum channel poses a significant computational challenge. The received signal must be synchronized to within a fraction of 100 ps, sampled and quantized at the spreading rate (10 GHz) and finally correlated with the code. In addition to this decoding challenge, the interference generated by different arrival paths to the receiver must be processed out. Choi, J. D., & Stark, W. E., "Performance of ultra-wideband communications with suboptimal receivers in multipath channels," *Selected Areas in Communications, IEEE Journal on,* 20(9), 1754-1766 (2002). These can be accomplished, at least in principle, by repeatedly computing a real-time Fourier transform of the received signal. Unfortunately, the last requirement calls for processors approaching $10^{12}$ floating-point operations per second (TFLOPS), well outside the mobile dissipation envelope. Jeon, D., et al, "Energy-optimized high performance FFT processor," Acoustics, Speech and Signal Processing (ICASSP), 2011 IEEE International Conference on (pp. 1701-1704). IEEE. (2011, May); Tang, S. N., et al., "A 2.4-GS/s FFT processor for OFDM-based WPAN applications," Circuits and Systems II: *Express Briefs, IEEE Transactions on,* 57(6), 451-455 (2010).

To transmit a signal in interference-free manner, normal spread-spectrum transmission broadens a signal bandwidth δf to Δf (where δf/<<Δf), reducing its spectral power density below band-regulated level ρ(f). Spectral broadening is achieved by imposing a unique codeword c(t), modulated at chip rate Δf. A transmission impaired, spectrally broadened signal must be sampled at the spreading rate (Δf) and subsequently decoded in real time. The decoding requires codeword synchronization with sub-chip precision and can be achieved in spectral domain by single multiplication.

When a channel experiences negligible multi-path interference (MPI), the encoded bit b[n] can be recovered by correlating the quantized received signal x[m] and the codeword c[m]. In Fourier domain, correlation is mapped to a single multiplication:

$$b[n] = \sum_{m=-N/2}^{N/2} c[m]x[m+n] \xrightarrow{\mathcal{F}} \tilde{C}^*[k]\tilde{X}[k] \qquad (1)$$

where $\tilde{C}$ and $\tilde{X}$ are the discrete Fourier transform (DFT) of the codeword and the received signal. In temporal domain, when the delay between the received signal and codeword is not known, the discrete summation in Eq. 1 must be performed repeatedly to recover data. However, this approach mandates for DFT of the received signal to be computed in real time, posing a progressively larger challenge as the spreading rate increases.

SUMMARY OF THE INVENTION

A preferred spread spectrum receiver includes an optical emitter that provides an optical signal to two optical paths. A signal frequency comb is modulated by an electro-optical modulator that replicates a received signal to its comb modes in a first optical path. A local oscillator comb is generated in the second one of the two optical paths. A wave shaper imprints terms of a codeword onto comb modes of the local oscillator comb. A combiner recombines optical signals from the two paths. A detector converts an optical signal from the combiner into an electrical signal that results in decoding of the spread spectrum signal. The local oscillator comb is mutually coherent to the signal frequency comb. In preferred embodiments, the wave shaper modulates each mode of the optical local oscillator comb with Fourier terms of the codeword, the combiner combines the modulated local oscillator and signal frequency combs, and the detector is an array of subrate detectors that detects product of the received signal and codeword in Fourier space, measures phase shifts resulting from the delay between the received spread spectrum signal and the codeword, and extracts the timing difference between the receiver and the received spread spectrum signal from the phases of Fourier terms of the received spread spectrum signal.

A preferred method for receiving a spread spectrum signal generates an optical signal frequency comb. Modes of the optical signal frequency comb are modulated with a received spread spectrum signal. An optical local oscillator comb is generated that is mutually coherent with the signal frequency comb. A codeword is applied to the local oscillator comb. The combs are combined and the product of the received spread spectrum signal and the codeword is detected from the combined combs.

A preferred method for receiving a spread spectrum signal physically reconstructs received data in the optical domain using a pair of coherently coupled frequency combs, one modulated by the received signal and one modulated by the code word, and then detects the received data with a subrate detector or detector array.

A preferred method of the invention is a method for measuring timing difference between a the codeword and the received spread spectrum signal. An optical signal frequency comb is generated. The optical signal frequency comb is modulated with a received spread spectrum signal. An optical local oscillator comb that is mutually coherent to the optical signal frequency comb is generated. Each mode of the optical local oscillator comb with the Fourier terms of a codeword. The modulated combs are combined. Fourier terms of the received spread spectrum signal are detected from the combined combs using an array of detectors. Phase shifts of the Fourier terms of the product of the codeword and the received spread spectrum signal are measured. A timing difference between the codeword and the received spread spectrum signal are determined from the phase shifts of the Fourier terms converted to the electrical domain by the array of the subrate detectors. To achieve synchronization between the received spread spectrum signal and the codeword, the count of the subrate detector element is lower than the count of the local oscillator or signal comb modes.

BRIEF DESCRIPTION OF THE DRAWINGS

FIGS. 2A and 2B illustrate a preferred receiver synchronization approach for a receiver of FIG. 1A;

FIGS. 7A and 7B illustrate mapping of delay by a subset of detectors in a detector array by channel selection to determine timing offset between a received signal and the codeword;

FIGS. 8A-8D illustrate periodic and aperiodic selection of subset of detectors for delay mapping.

DETAILED DESCRIPTION OF THE PREFERRED EMBODIMENTS

Figure 1A:
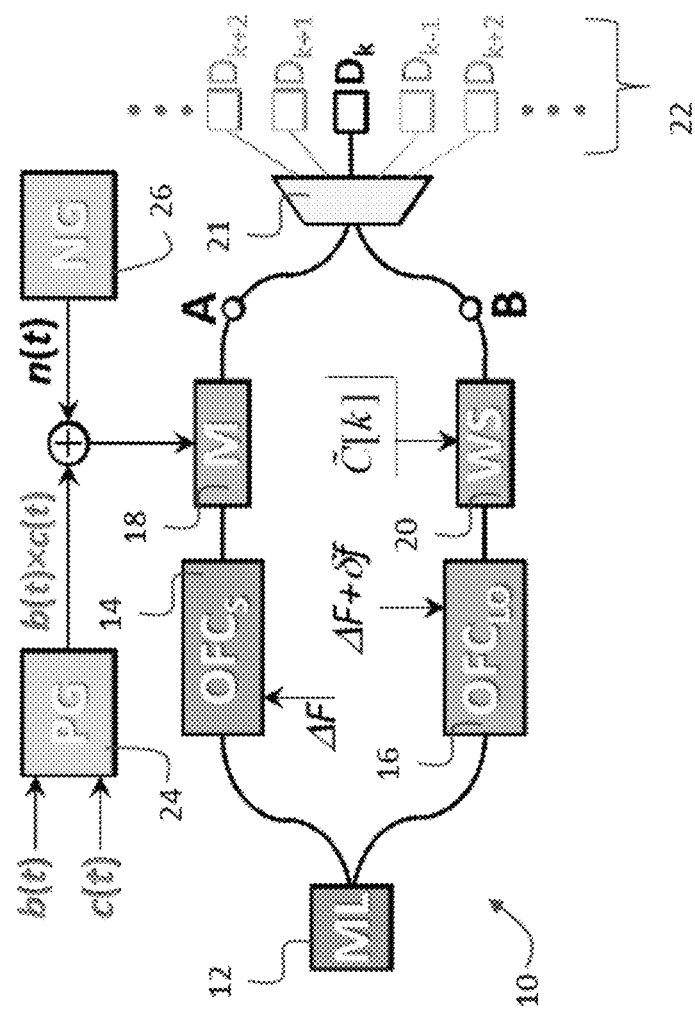
FIG. 1A is a schematic diagram of a preferred embodiment comb-assisted spread spectrum receiver of the invention and signal.

Embodiments of the invention provide new class of spread spectrum RF receivers and reception methods that enable communications channels that are not limited to narrow RF bands. In contrast to conventional spread-spectrum receivers, preferred receivers and reception methods do not require complex synchronization and can operate in the presence of multi-path interference. Preferred spread spectrum receivers and reception methods can be used with existing spread spectrum transmitters and transmitting methods, which is an advantage as no changes are required at the transmitter.

Preferred receivers and reception methods avoid high-speed processing requirements of conventional receivers. A preferred receiver circumvents the dissipation barrier imposed by GHz-rate electronics. With avoidance of the GHz-rate electronics, preferred receivers can access the entire RF range. This provides the foundation for a new class of regulation-free wireless services that can maximize throughput, mitigate interference and achieve a high level of physical security.

Preferred embodiment receivers are photonically assisted spread spectrum receivers. A master laser provides an optical signal from which combs are derived. A signal frequency comb is modulated to replicate a received signal to N comb modes. A local oscillator comb is modulated by a wave shaper that imprints terms of a codeword onto each comb mode. In a synchronized state, two combs are multiplied and integrated by a sub-rate detector to decode the spread-spectrum channel.

Preferred embodiments avoid the computationally intense tasks of ultrawideband signal and computing its correlation with the spreading sequence, and instead physically reconstruct data by coherently coupled frequency combs. Experimental embodiments have demonstrated, for example, that a channel spread over 6 GHz can be decoded even when its power is 10 dB below the interfering noise. In contrast to conventional spread-spectrum receivers, preferred embodiment receivers do not require complex synchronization and operate in presence of multi-path interference. Without the need for the ultra-high-speed processing required to achieved the synchronization, preferred receivers can access the entire RF range, while circumventing the dissipation barrier imposed by GHz-rate electronics. Preferred receivers can enable a new class of regulation-free wireless services that maximize throughput, mitigate interference and achieve a high level of physical security.

Preferred embodiments show that the spread-spectrum signal does not have to be digitized at the spreading rate and its Fourier decomposition can be obtained in a computation-free manner, which therefore enables an arbitrarily wide spectral spreading. Experimental embodiments show that data from a spread-spectrum channel can be recovered in the physical domain, without resorting to a high-speed electronic processor. Experiments demonstrated, for example, that a 20 MHz wide signal could be spectrally spread over 6 GHz by direct-sequence modulation and decoded in the presence of noise. Encoded information was recovered by a single-step multiplication of the received signal and the spreading sequence in the physical domain. The measurements prove that a wideband, spread-spectrum channel can be reconstructed asynchronously, even when accompanied by a noise that exceeds signal power by 10 dB, across the entire spread spectrum.

Preferred embodiments of the invention will now be discussed with respect to the drawings and experiments that demonstrate principles of the invention. Applications and broader aspects of the invention will be understood by artisans in view of the general knowledge in the art and the description that follows.

Figure 1B:
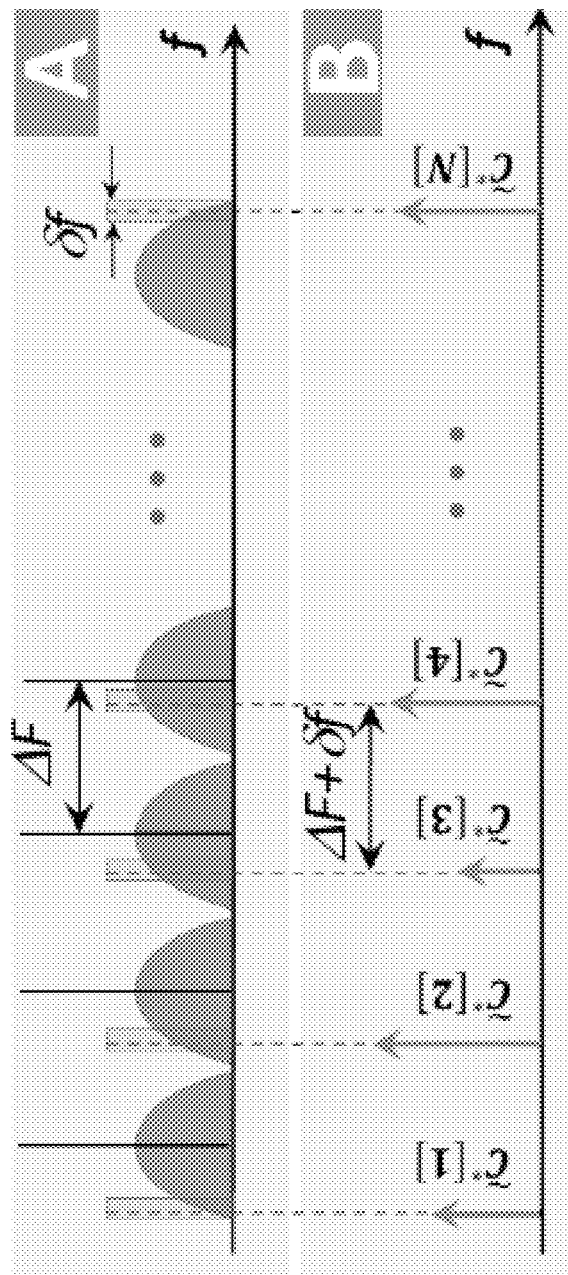
FIGS. 1B-1E illustrate signals of the FIG. 1A receiver.
Figures 1C, 1D, 1E:
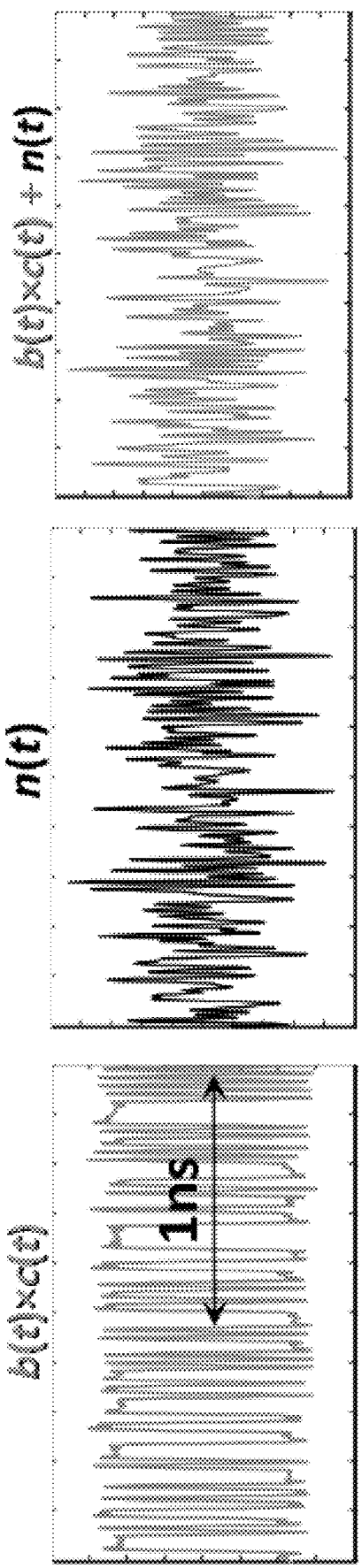

FIG. 1A illustrates a preferred embodiment receiver 10, which performs Fourier decomposition and code matching in the physical domain, eliminating the need for high-rate digitization and subsequent electronics processing. The receiver 10 includes an optical emitter, e.g., a master laser 12, that generates two mutually coherent optical frequency-tunable combs (OFC), specifically a signal frequency comb 14 ($OFC_S$) and a local oscillator frequency comb 16 ($OFC_{LO}$). The optical emitter 12 can be realized also, for example, with two injection locked optical emitters in each of the two optical paths. With reference to FIG. 1B, the signal frequency comb 14 ($OFC_S$) is modulated by an electro-optical modulator 18 (M) that receives a signal sensed by an antenna (represented in FIG. 1B by experimental signal generation components PG 24 and NG 26) of the receiver 10 to replicate a received signal to N comb modes. Local oscillator comb ($OFC_{LO}$) is modulated by a wave-shaper 20 (WS), imprinting terms of codeword DFT onto each comb mode. The signal comb generated by the signal frequency comb 14 ($OFC_S$) is set of tones that are passed through the electro-optical modulator 18 and are thereby made to carry a replica of the antenna signal received at the RF receiver 10. The tones generated by the local frequency comb 16 ($OFC_{LO}$) are not modulated by the received signal, but are instead shaped by a specified waveform (codeword DFT) that can be considered slow in comparison to the chip duration of the encoded spread-spectrum signal. In the synchronized state, two comb modes from a path of the signal frequency comb and a path of the local oscillator comb are combined by optical combiner 21 that combines optical signals received from the two optical paths. The combined optical signal is then decoded by a sub-rate detector 22 array (Dk), that converts an optical signal to an electrical signal and decodes the spread-spectrum channel Analog to digital conversion (not shown) is conducted after the subrate detector array. FIG. 1A also shows an experimental signal generator used to test the receiver 10. Subrate means that that the detector speed (bandwidth) is the bit rate ($\delta f$) and that signal bandwidth is the chip rate ($\Delta f$), with $\delta f \ll \Delta f$. The signal generator included a pattern generator (PG) 24 and a noise generator (NG) 26. FIGS. 1C-1E show example signal, noise and combined waveforms from an experiment, where b denotes the bit pattern and c denotes the codeword. To achieve synchronization between the received spread spectrum signal and the codeword, the count of the subrate detector elements does not need to be equal to the count of the local oscillator or signal comb modes; the count of subrate detector elements that is lower than the count of the local oscillator comb modes can also perform the synchronization function. "Element" is a subrate detector, and a set of elements forms the detector backplane.

Each of the optical combs 16 and 18 can be realized with various optical domain devices. The signal frequency and local oscillator combs can be, for example, generated by a mode-locked laser (which is mixed/interfered with the another laser). Other devices include optical modulators, nonlinear resonant devices, and nonlinear mixing in an optical waveguide or a crystal.

In preferred embodiments, the modulator 18 is an optical modulator such as Mach Zehnder modulator (MZM). More generally, the modulator 18 is modulator that is capable of modulating an optical carrier in phase, amplitude or both. Any modulator that can modulate comb tones can be used. Other preferred modulators include—a phase modulator or silicon modulator (which is not a traveling-wave device).

The wave shaper 20 is a spectral filter that can impose given amplitude and/or phase to a given portion of the spectra. Specific examples included chirped gratings and LCD-based filters.

The receiver 10 performs Fourier decomposition and code matching in the physical domain, eliminating the need for high-rate digitization and subsequent electronics processing. To illustrate its operating principle, we consider the reception of a signal with bandwidth $\delta f$ that was spectrally spread to $\Delta f = N \times \delta f$ width using a coding sequence of length N. The received spread-spectrum signal modulates N modes of the optical signal frequency comb ($OFC_S$) 12, spectrally replicating the received field. The second, mutually coherent local oscillator (LO) comb ($OFC_{LO}$) 14, is subsequently combined with signal replicas from the upper path and detected by the detector array D 24. The difference in frequency pitch between two combs $\delta F = \Delta F_{LO} - \Delta F_S = \Delta f/N$ is specifically chosen to guarantee that each $OFC_{LO}$ mode overlaps with a different segment of the received spectrum, as shown in FIG. 1B. If each comb pair is sent to a sub-rate detector ($D_k$) that matches the native signal bandwidth OA then the resulting array output is a discrete Fourier decomposition of the received field $\tilde{X}[k]$, k=1, N. However, if $OFC_{LO}$ modes are encoded by the spreading sequence $\tilde{C}^*[k]$, the output corresponds to the bit-decoding operation in Eq. (1). In a synchronized state, the receiver array is redundant and a single, subrate receiver is sufficient to decode the original bit-stream. As a result, the received 10 architecture completely eliminates the need for high-rate digitization and correlative processing at full-spreading rate ($\Delta f$).

In experiments, the signal comb 12 had frequency pitch of $\Delta F_S = 24.99$ GHz, while the LO comb 14 pitch was $\Delta F_{LO} = 25.01$ GHz to accommodate 20 MHz signal bandwidth. The optical modulator was used to replicate the combined spread-spectrum and noise input onto N=300 comb tones, allowing for 300-fold spectral spreading. The initial 20 Mb/s data stream was encoded by 6 GHz-wide (chip duration $\Delta t = 167$ ps) codeword using a digital pattern generator. Separately, 6 GHz-wide Gaussian noise was digitally generated and combined with the spread-spectrum channel at variable signal-to-noise-ratio (SNR) at the input of the receiver. The local oscillator comb 14 was modulated by a quasi-static pattern codeword $\tilde{C}[k]$ using the optical waveshaper 20, as the conjugation of the local oscillator field is achieved in the coherent detector. The codeword can be changed, but the rate of change is slower than the bit rate. The architecture provided for full scaling of the sub-rate detector array 22, allowing measurement to be taken with a single, few or full detector complement. Delay control between the received signal and the codeword was precisely controlled by digital generators (for purposes of the experiments), as required for performance measurement in asynchronous state. To validate the comb-assisted decoding principle, it is not sufficient to operate the receiver in synchronous state with precisely aligned codeword and received channel. Instead, the experiment was conducted in an asynchronous state, with unknown delay between the two. In conventional spread-spectrum receivers, the synchronization process greatly depends on the code length. If the sequence is short, an unknown delay can be found by imposing repeated multiplication and a chip-scale temporal shift. Unfortunately, this approach calls for up to $N^2$ multiplications and induces excessive delay as the code length (N) increases. To counter this, receivers are often parallelized, nesting coarse and fine delay searches. In contrast, if the DFT of the received signal does not need to be computed, a qualitatively different synchronization approach can be used with the present receiver and receiving methods, which is illustrated in FIGS. 2A and 2B.

Figure 2B:
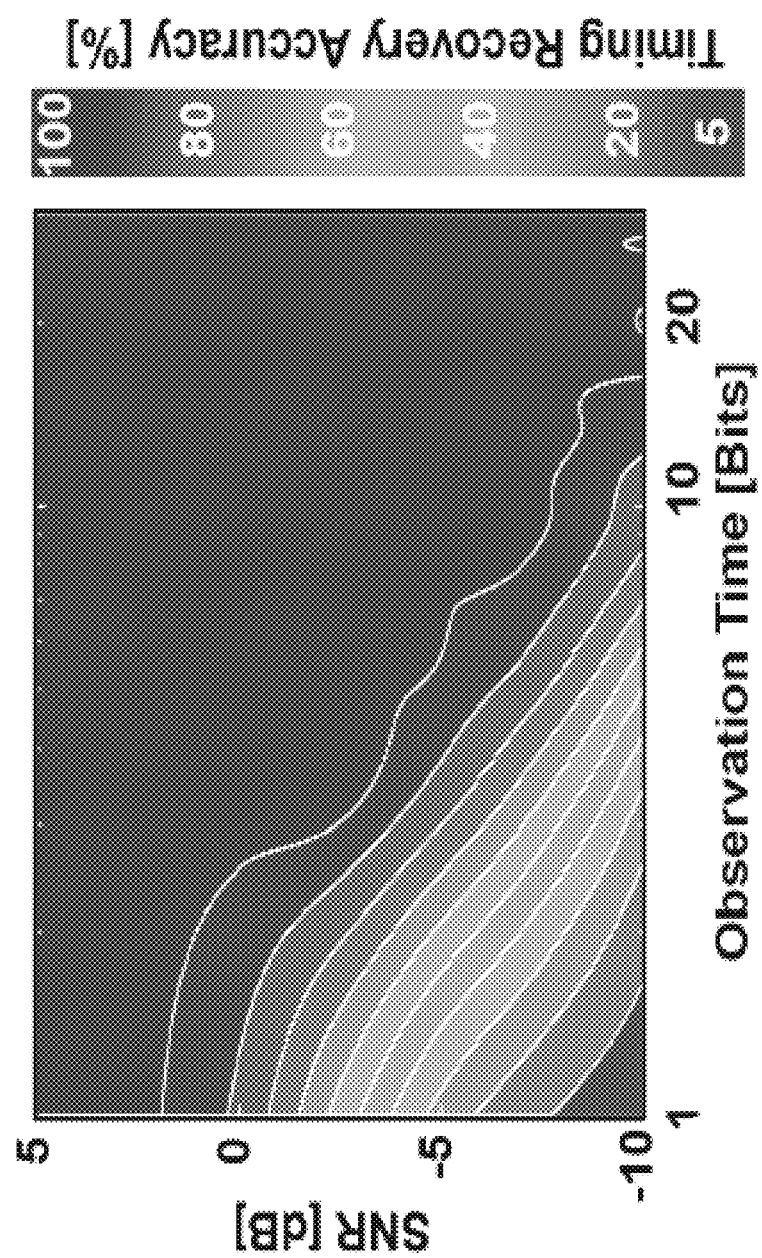

FIG. 2A shows synchronous and asynchronous decoding representations in the Fourier domain. FIG. 2B shows the synchronization performance of 6 GHz-wide spread-spectrum channel generated by 300-long code and native 20 Mb/s data obtained with a unique set of 25 subrate detectors. In the Fourier domain, decoding corresponds to vectorial multiplication between the signal and the conjugate of the codeword. In a synchronized state, this operation maps the complex terms of signal DFT expansion onto the real axis, allowing for simple summation. However, when signal x(t) experiences unknown delay τ, its Fourier transform $\tilde{X}(f)$ sees frequency-dependent rotation $2\pi f\tau$ in complex plane: $\tilde{X}e^{-j2\pi f\tau}$. This means that the $k^{th}$ term of signal DFT expansion will be rotated by $2\pi k\delta f\tau$, creating a unique curvature, as shown in FIG. 2A. Consequently, if the full complement (N) of detectors is available the synchronization problem can be reduced to an N-point interpolation in complex plane.

A significantly more difficult problem is posed by synchronizing with a sparsely populated subrate detector plane, particularly in case when the signal is noisy. In absence of noise, only a few terms of the signal DFT expansion are sufficient to accurately interpolate the delay curve. With increased noise, DFT terms drift randomly, reducing the confidence with which the delay curve can be fitted. Consequently, the synchronization challenge for the present comb-assisted receiver can be articulated in simple terms: given the received SNR, what is the minimum number of sub-rate detectors necessary to achieve synchronization-?Surprisingly, the answer to this question greatly depends on the selection of the specific detectors from the fully populated array, and not only on their total count. This argument can be qualitatively understood by comparing the selection of a subset of adjacent receivers against selecting a periodic sparse subset. The former set will have poor temporal resolution due to its limited frequency span while the latter will have high temporal resolution but many ambiguities due to phase unwrapping errors. However, to select a subset of M detectors from N-detector array, one must evaluate N!/M!/(N−M)! possibilities. In our case (N=300), a selection of a 25 detector subset must be made out of a total of $1.95\times 10^{36}$ possibilities. Consequently, a partial search for an optimal frequency set was carried out and used to measure synchronization performance, as shown in FIG. 2A. At high SNR, a single bit was sufficient to interpolate a 25-point DFT constellation in complex plane and achieve 100% timing accuracy. However, when noise power is an order of magnitude higher than the signal (SNR=−10 dB), full timing accuracy required observation over 18 bits.

Figures 3A, 3B:
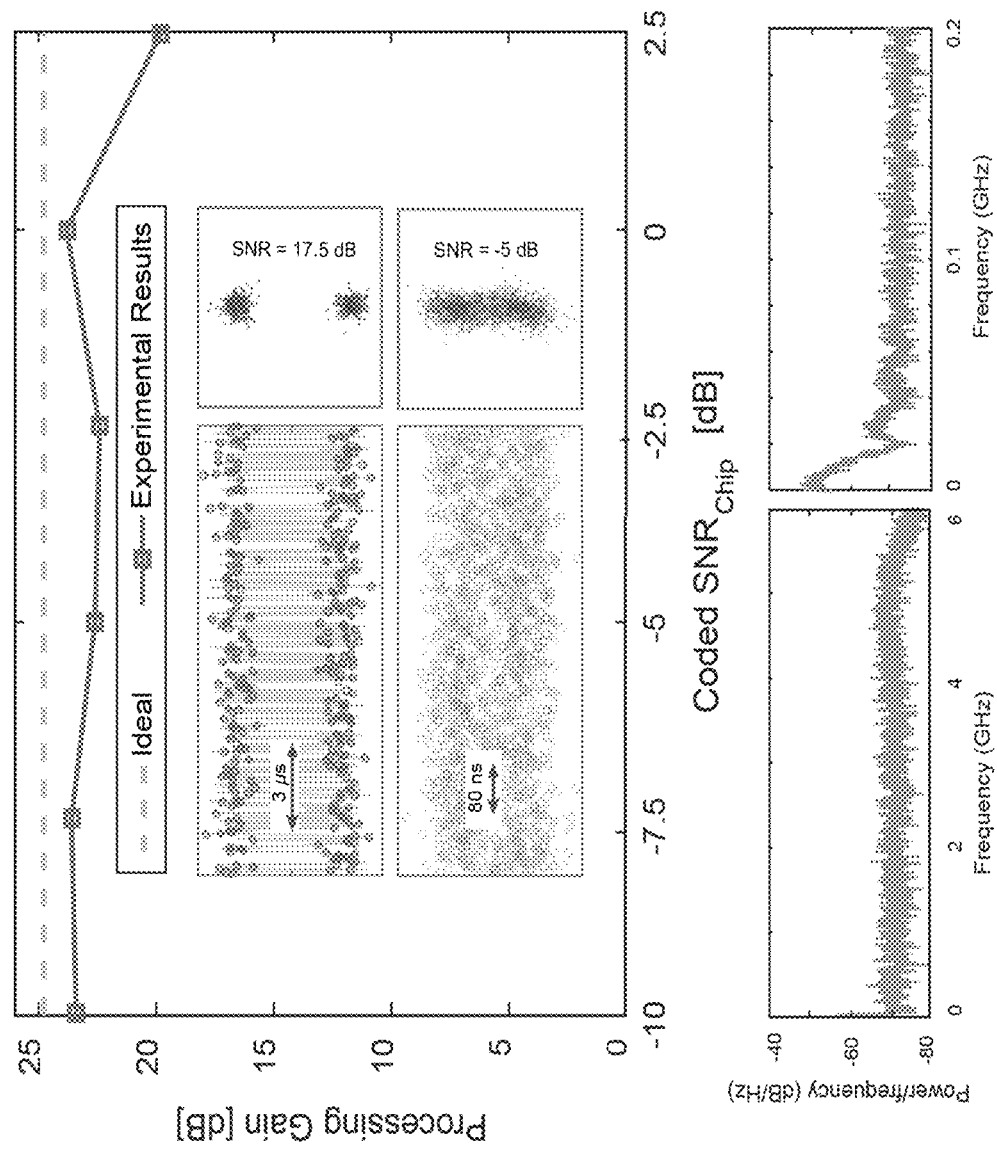
FIGS. 3A and 3B illustrate decoding results of a noisy spread spectrum channel with the present receiver and receiving methods.

FIGS. 3A and 3B illustrate decoding results of a noisy spread spectrum channel with the present receiver and receiving methods, which show theoretical coding gain of 300-fold spectral spreading (24.7 dB) compared with measurement. Received (SNR=−5 dB) and decoded signals are shown in FIG. 3A and FIG. 3B shows the corresponding spectra plot. The ability to operate the receiver in asynchronous mode permits the ability to rigorously measure the coding gain. A 1024-bit packet was spectrally spread and used to decode data using a single sub-rate detector without any computation. Sub-noise measurement at SNR=−10 dB results in coding gain difference of only 1.3 dB with respect to theory (24.7 dB).

These experiments demonstrated that a spread-spectrum signal can be received and decoded in a computation-free manner. While the experiments concerned measurements of a 6 GHz-wide channel, artisans will understand that the present receiver and receiving methods can be easily scaled by increasing the count of mutually coherent frequency comb tones. In contrast to conventional receivers that are ultimately limited by the speed at which a signal can be digitized and subsequently processed, the new device offers a clear path to full RF coverage that extends beyond 100 GHz. Experimental measurements indicate that the comb-assisted receiver can operate in asynchronous mode, even when the received signal is noisy.

Experimental Details

The data channel was spectrally spread in the electrical domain, using a 13 GHz-wide pulse pattern generator (PG) to synthesize a 6 GHz-wide coding sequence. The minimum transition time that could be created in this manner was 20 ps. The spread spectrum signal is created by digital signal processing (DSP), prior to its mapping into optical domain. The 20 MHz channel data content (payload) was generated by a $2^{10}$ long pseudo random bit sequence (PRBS). This bit pattern was then multiplied by a 300-chip long codeword (which can be changed over time as a rate that is much slower than the bit rate, i.e., the codeword can be quasi-static), spreading the 20 MHz signal to 6 GHz width. The codeword was synthesized by selecting the first 300 symbols of a $2^9$ long PRBS. The resultant waveform was then uploaded to the PG and subsequently electrically filtered to limit the output bandwidth to 7 GHz. Separately, a 6 GHz wide, 170.6 μs long white-Gaussian-noise (WGN) waveform was generated using a 10 GS/s, 10-bit resolution digital to analog converter (DAC). Digital noise generation, while requiring a high-speed DAC, was specifically selected over a simpler, conventional (analog) noise source in order to allow for repeated backplane measurements under identical noise loading conditions. This allows for a complete and calibrated measurement of the receiver without physically assembling a full 300-detector subrate array. An arbitrary detector element response and its contribution to the array output can be measured by repeating the digital noise stimulus at the input. Conversely, this would not be possible if an analog (thermal) noise source was used, since the identical noise loading condition cannot be replicated in this manner. The output of the pattern generator was attenuated to vary the received signal power and combined with calibrated noise power to create a given SNR level at the receiver input. The combined signal and noise were imprinted onto modes of the signal comb using a bias-controlled Mach-Zehnder modulator (MZM).

The synchronization between the noise-generating DAC and the data pattern generator was controlled to guarantee that the sequential capture of subrate detector outputs (corresponding to DFT coefficients) was performed under a precise noise-loading condition. This also required that both optical combs remain stable during the entire capture process. The latter was achieved by deriving both combs from a single, 8-kHz linewidth master laser.

Figure 4:
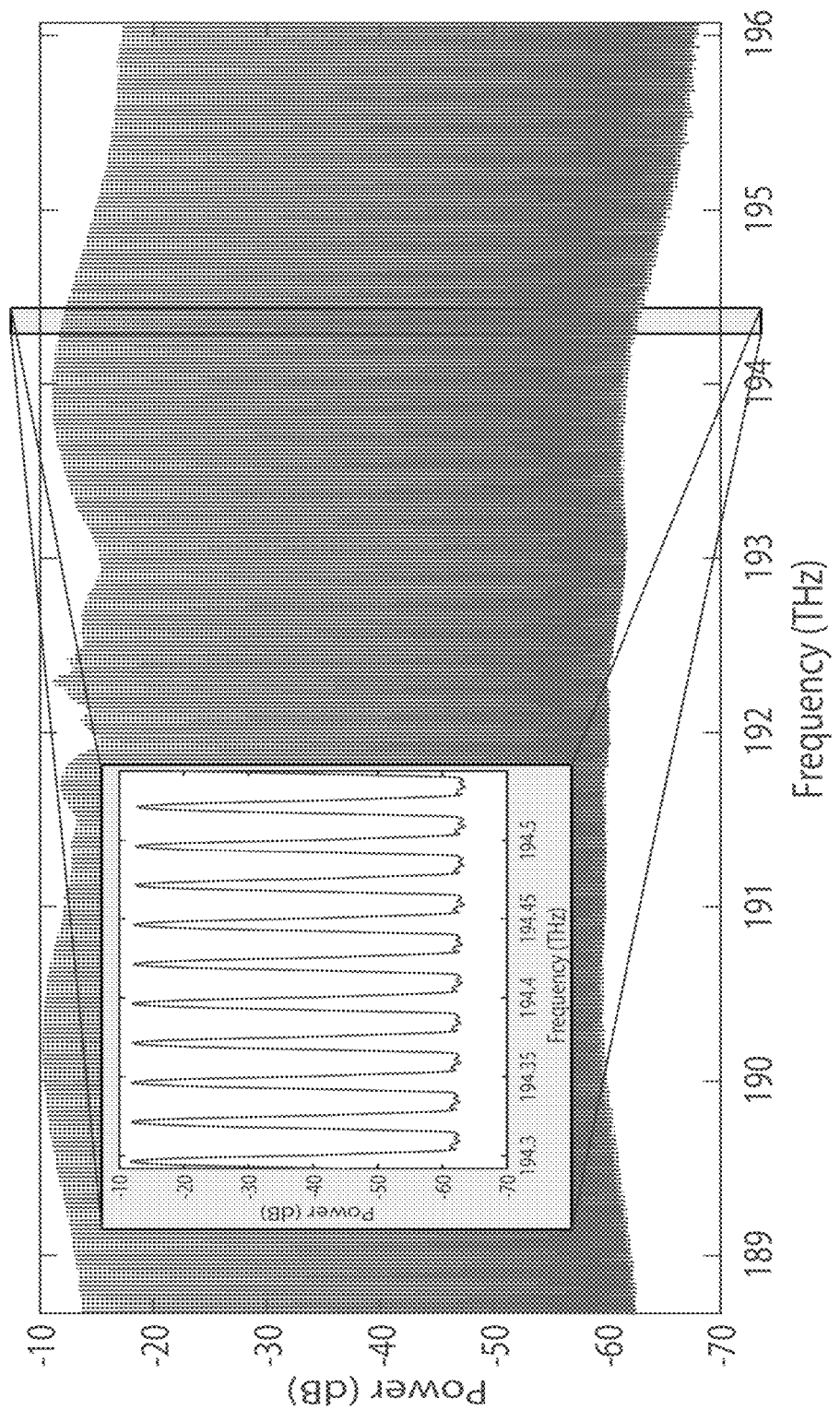
FIG. 4 is a plot of an example of the optical spectrum of a 24.99 GHz pitched comb from an experimental embodiment captured by an optical spectrum analyzer (OSA) at 0.01 nm resolution bandwidth (RBW)

The optical carriers used to replicate the electrical signal were generated by a cavity-less comb source. See, Ataie, V., Myslivets, E., Kuo, B. P.-P., Alic, N., Radic S., "Spectrally Equalized Frequency Comb Generation in Multistage Parametric Mixer with Nonlinear Pulse Shaping," *J. Lightwave Technol.* 32, 840-846 (2014). A second, mutually coherent comb source was also generated from the same laser seed (i.e. $OFC_{LO}$) with a frequency pitch of 25.01 GHz. The signal comb ($OFC_S$) with more than 300 highly coherent optical frequency tones separated by 24.99 GHz with over 40 dB OSNR at 0.1 nm is plotted in FIG. 4. After generation, $OFC_S$ was then routed into a null-biased MZM (Mach Zehnder modulator) to replicate the electrical signal. To perform the demodulation without computation, a waveshaper was used to modulate 300 tones from $OFC_{LO}$ with both the amplitude and phase of each code word DFT coefficient $\tilde{C}[k]$. Finally, the amplitude and phase response of the full system was measured in order to compensate any spectral ripple and arm-mismatched dispersion profiles. Subsequent experiments demonstrated use of the wave shaper to modulate more than 4000 tones from $OFC_{LO}$.

Figures 5A, 5B, 5C, 5D, 5E, 5F:
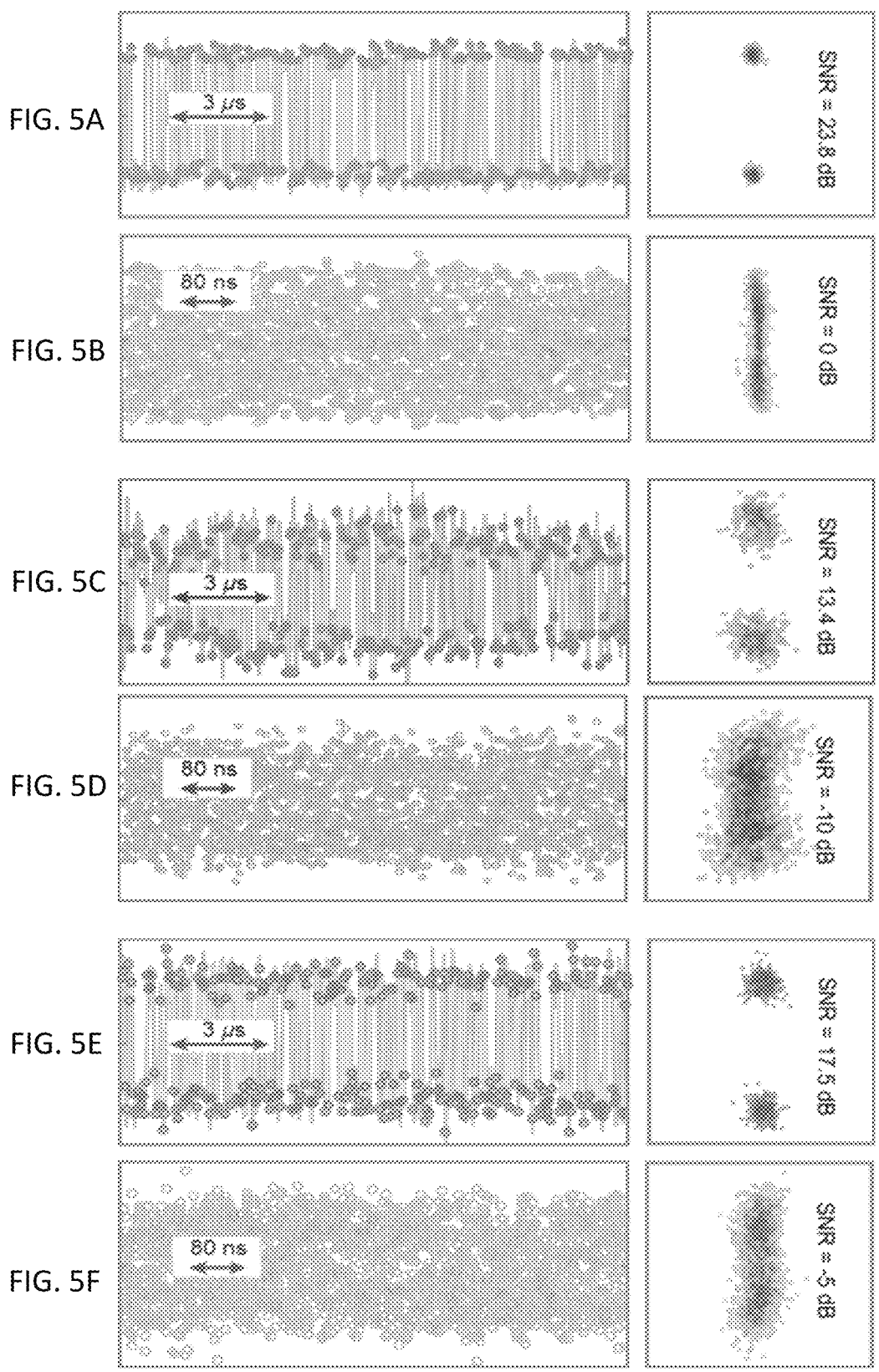
FIGS. 5A/5B, 5C/5D, and 5E/5F respectively show decoded/received channels in an experimental receiver for SNR of 0, −10 and −17.5 dB.

Once the synchronization between the codeword and signal is achieved, the temporally modulated $OFC_S$ and spectrally modulated $OFC_{LO}$ were combined in a single coherent detector. The LO comb downconverts and demodulates all 300 signal optical carrier frequencies to baseband where 20 MHz band-limited coherent summation is achieved. This results in demodulation of the coded data stream computation-free. The output is captured by an analog to digital converter (ADC) to extract the bits and measure the coding gain. As an example, with an input SNR of −10, −5 and 0 dB a total coding gain of 23.4, 22.6 and 23.8 dB was achieved, respectively. When compared to the theoretical gain of 10×log(300)=24.7 dB, this corresponds to a difference of 0.6, 2.1 and 0.9 dB, respectively. FIGS. 5A/5B; 5C/5D and 5E/5F respectively and plot the decoded and received channel for SNR of 0, −10 and −17.5 dB.

Synchronization

Figure 6B:
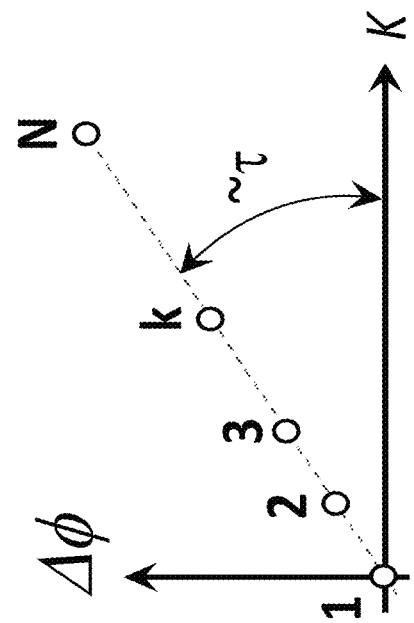
FIGS. 6A and 6B illustrate mapping of delay to determine timing offset between a received signal and the codeword.
Figure 6A:
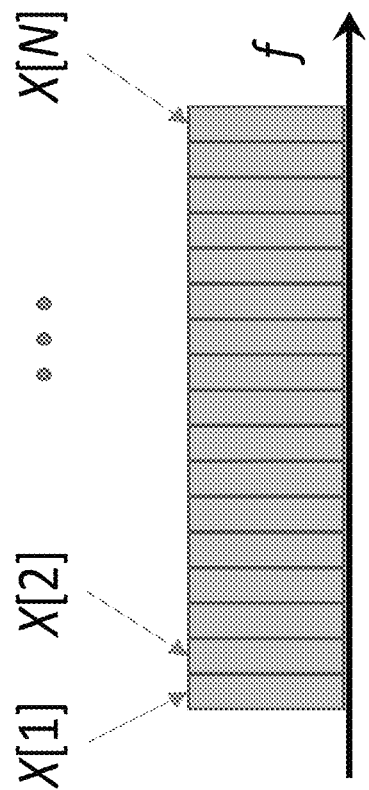

To decode and demodulate the transmitted bit stream, the timing offset between the received signal and the codeword must be known accurately to within a single chip ($\Delta\tau$) when a single detector is used because subrate detector itself cannot perform synchronization because its response time is much larger than the chip duration. A timing offset of $\tau$ between the received DFT coefficients $\tilde{X}[k]$ and the codeword conjugate DFT $\tilde{C}^*[k]$ manifests as an incremental phase rotation of $2\pi k\delta f\tau$ in their product $\tilde{A}[k]=\tilde{X}[k]\times\tilde{C}^*[k]$. FIGS. 6A and 6B illustrate mapping of the DFT delay to determine timing offset between a received signal and the codeword. Specifically, Received signal DFT (X[k]) multiplication with the codeword (C*[k]) results in convolution in frequency domain (X[k]×C*[k]) that has a linear phase ($\delta\phi$) proportional to signal-code delay ($\tau$).

When the receiver comprises a fully populated subrate detector array ($D_k$, k=1,N see FIGS. 1A & 1B), the delay can be found by interpolating the N-point sequence in the $\Delta\phi$-k plane. While superior in terms of latency (synchronization is achieved within a single bit delay), this approach poses a challenge when very large arrays (N>1000) need to be integrated. Consequently, it is important to quantify the performance of the receiver when only a subset of M (M<N) subrate detectors is available to perform synchronization function. To understand this challenge, it is instructive to consider the frequency- and temporal-domain implication of the subset array selection, which is illustrated in FIGS. 7A and 7B.

In FIGS. 7A and 7B, a channel selection function (CS[k]) that relies on M<N adjacent frequency bins (subrate detectors) maps to sync function in time defined by nulls at ~($\delta f\times M$)$^{-1}$. $\Delta\tau$—chip duration. When M<<N, the temporal resolution approaches that of a single subrate detector and is insufficient for accurate synchronization between the code and the signal. Consequently, the channel selection function that selects adjacent frequency bins is sub-optimal and can be replaced, under the constraint that the number of subrate detectors (M) is constant. Criterion can be constructed in the temporal domain by requiring that the ratio between the peak (P) of the channel selection function cs[n] and any of its sidelobes (p) remains as high as possible (maximizing contrast therebetween), which preferred selection criterion is shown in FIGS. 8A-8D Preferred selection functions therefore seek to maximize contrast, as illustrated in FIG. 8D, where the peak of the channel (P) has been maximized with respect to the sidelobes (p). FIGS. 8A and 8B illustrate selection by periodic frequency bins and FIGS. 8C and 8D by aperiodic frequency bins by a preferred selection function CS[k].

Unfortunately, while a strictly periodic CS function results in high contrast (i.e. ratio P/p), its inherent ambiguity offers little utility with respect to the synchronization problem to be solved. Consequently, it is necessary to identify a unique set of M receivers that would maximize channel selection contrast while simultaneously eliminating any timing ambiguity. In the absence of additional selection criteria, this requires a search for a unique combination of M numbers, selected out of a larger (N>M) set. For a subset of M subrate detectors, this means that one must select from N!/(M!×(N−M)!) possibilities. As an illustration, for N=1000, corresponding to practically viable tone count, and subrate detector set of M=100, there are ~$10^{140}$ options.

To demonstrate the performance of the receiver architecture in predicting this timing offset, a 1024-bit packet was generated and used to acquire synchronization using 25 subrate detectors. Bits were generated at 20 MHz rate and spread to 6 GHz rate using a 300 length PRBS. As described earlier, SNR conditions were varied by changing the signal and noise power ratio. The electrically generated signal and noise were then modulated onto the signal comb (i.e., $OFC_S$) consisting of 300 spectral tones effectively replicating the signal. To synthesize the response of a fully populated detector array (i.e. 300 of 20 MHz bandwidth detectors), a tunable optical filter was used to select each channel from the signal and LO combs individually and route to a single coherent detector. Each of the 300 channels was digitized using an analog-to-digital converter (ADC) and recorded. While it was not necessary to perform the measurement of all 300 tributaries to characterize the 25-subset, the full complement of experimental capture has allowed to test the hypothesis of the selection function uniqueness.

A timing offset of $\tau$ between the received DFT coefficients $\tilde{X}[k]$ and known codeword conjugate DFT $\tilde{C}^*[k]$ manifests as an incremental phase rotation of $2\pi k\delta f\tau$ in their product. To estimate this linear phase slope, the maximum likelihood condition for estimation is determined as follows:

$$\tau = \max_{\tau_i} \left| \sum_{k=-N/2}^{N/2-1} \tilde{X}[k]\tilde{C}^*[k]e^{-j2\pi k\delta f \tau_i} cs[k] \right| \quad (2)$$

-continued $$\tau_i = \frac{i}{\delta f}, i = -\frac{N}{2}, -\frac{N}{2}+1, \ldots, \frac{N}{2}-1$$

where cs[k]∈{0,1} is a channel selection function that selects a partial subset of the receivers. The above uses a line extrapolation technique from Rife, D. C., Boorstyn, R. R., Single-Tone Parameter Estimation from Discrete-Time Observations. *IEEE Transactions of Information Theory.* 20(5), 591-598 (1974). For timing recovery, a unique 25 subset of the 300 frequency bins (detectors) was selected. As predicted, the selecting pattern of this 25 subset has a dramatic effect on the accuracy of the timing estimation. As explained in FIGS. 7A-8D, choosing 25 frequency-adjacent or 25 periodically spaced detectors (i.e. every $12^{th}$-bin separated in the 300 channel case) is suboptimal. The former case has poor timing resolution (insufficient for chip-scale accuracy) due to its limited spectral span (500 MHz compared to 6 GHz). The latter case has ideal timing resolution as it spans the full 6 GHz bandwidth, but suffers from multiple ambiguities encountered during the phase unwrapping. This effect can also be understood in terms of aliasing due to the uniform down-sampling. We searched for a unique, sparse subset to achieve both good timing resolution with no ambiguities. Unfortunately, searching for an optimal selection of 25 subset receivers from 300 requires testing over $1.95 \times 10^{36}$ different combinations, which is a significant computational problem. Instead, $10^{10}$ subsets were randomly generated and tested, resulting in the optimal subset shown in FIGS. 9A and 9B. The timing recovery accuracy was predicted by comparing the number of bits recovered by Eq. (2) out of the total number of bits (i.e. $2^{10}$).

Figure 9A:
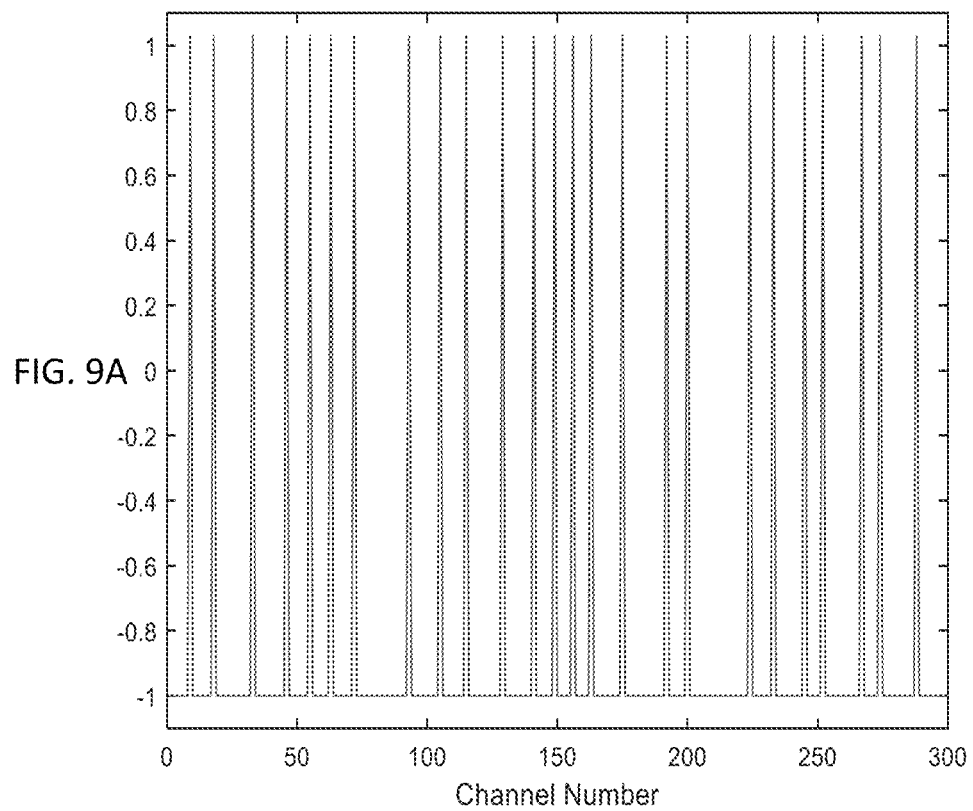
FIGS. 9A and 9B illustrates an approximated optical selection of subrate detector frequency.
Figure 9B:
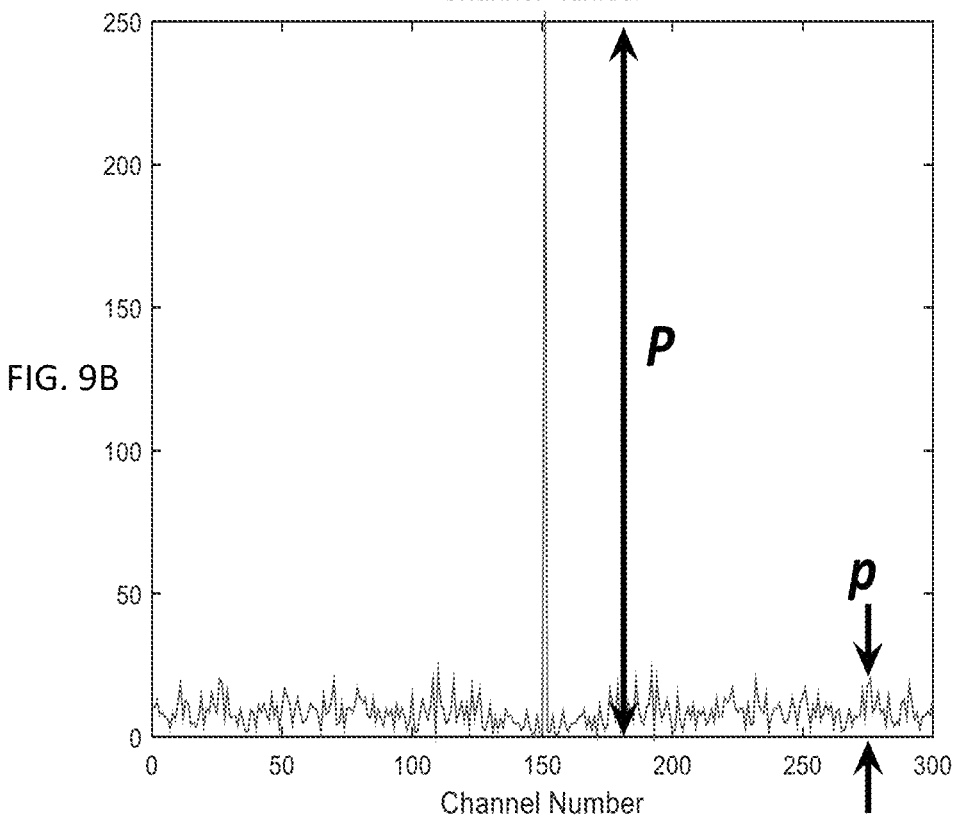

Specifically, the approximated optimal selection function of 25 subrate detector bins in shown in FIG. 9A. The selection function in temporal domain offers contrast of P/p~15. We note that the function is only an approximation of a true optimal function because it is the result of a search that covers only a fraction of the entire array combination space. However, the approximate optimal function provides an efficient and powerful spread spectrum reception method when implemented in a receiver in accordance with FIG. 1A.

Multi-Path Interference Equalization

The present receivers and reception methods can be used to equalize interference generated by multipath interference (MPI). To demonstrate this capability, an MPI-induced degradation was generated and mitigated. To generate MPI, the 6 GHz spread spectrum electrical signal out of the PG (FIG. 1A) was amplified and split into four RF paths using a passive coupler. Subsequently, a delay and attenuation value was assigned to each RF path. The four paths with varying delay were then recombined by a second coupler. The MPI signal was then combined with electrical Gaussian noise in an RF coupler to simulate a low SNR received signal. The MPI signal was generated with delays of 12.8, 18, 24, and 47.2 ns, each with varying SNR. To demonstrate receiver operation in presence of MPI, the timing delay of each path was acquired and measured. The timing offset was measured using the 25 subset receiver array, and the offset is predicted using Eq. (2). The results showed that within 30 bits of observation at 20 MHz, the timing offset of each multipath can be acquired with high confidence and used to subsequently equalize MPI.

While specific embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the invention are set forth in the appended claims.

The invention claimed is:

1. A spread spectrum receiver comprising:
    an optical emitter that generates a signal frequency comb having comb modes in a first one of two optical paths and generates a local oscillator comb having comb modes and that is mutually coherent to the optical signal frequency comb in a second one of the two optical paths;
    an electro-optical modulator that replicates a received spread spectrum signal to comb modes of the signal frequency comb,
    a wave shaper that imprints a codeword onto comb modes of the local oscillator comb,
    a combiner that combines optical signals from the two paths after said modulator and said wave shaper; and
    a detector that converts an optical signal from the combiner into an electrical signal that represents the received spread spectrum signal.

2. The receiver according to claim 1, wherein the optical emitter comprises a master laser.

3. The receiver according to claim 1, comprising two injection locked optical emitters sharing a common seed in each of the first and second optical paths.

4. The receiver according to claim 1, wherein the signal frequency comb comprises an optical frequency comb generated by one of a mode-locked laser, optical modulator, nonlinear resonant element or via nonlinear mixing in optical waveguide or a crystal.

5. The receiver according to claim 1, wherein the local oscillator comb comprises an optical frequency comb generated by one of a mode-locked laser, optical modulator, nonlinear resonant element or via nonlinear mixing in optical waveguide or a crystal.

6. The receiver according to claim 1, wherein the optical modulator comprises on of an optical phase modulator, an optical amplitude modulator, or an optical polarization modulator.

7. The receiver according to claim 1, wherein the decoder comprises a single subrate detector.

8. The receiver according to claim 1, wherein the detector comprises an array of subrate detectors.

9. The receiver according to claim 8, wherein the array of subrate detectors synchronizes the received spread spectrum signal and the code word.

10. The receiver according to claim 8, wherein the wave shaper modulates each comb mode of the optical local oscillator comb with Fourier terms of the codeword to provide a modulated local oscillator comb, the combiner combines comb modes of the modulated local oscillator comb and comb modes of the signal frequency comb to which the received spread spectrum signal were replicated, wherein the detector comprises an array of subrate detectors that detect Fourier terms of the received spread spectrum signal from the combined modulated signal frequency and local oscillator combs, measures phase shifts of the Fourier terms of the product of the received spread spectrum signal and the codeword, and extracts the timing difference between the receiver and the received spread spectrum signal from phase shifts of the Fourier terms of the product of the received spread spectrum signal and the codeword.

11. The receiver according to claim 1, wherein the received signal has a native signal bandwidth of δf that was spectrally spread to Δf=N×δf and the received signal modulates N modes of the signal frequency comb to spectrally replicate a received field of the received signal and the local oscillator comb is subsequently combined with signal replicas by the combiner and detected by the detector, wherein the detector comprises a set of subrate detectors that perform codeword synchronization and decoding of the content of the received signal.

12. The receiver according to claim 11, wherein a count of subrate elements in the set of subrate detectors is equal or smaller to a number of modes in the signal frequency and local oscillator combs.

13. The receiver according to claim 11, wherein a difference in frequency pitch between the signal frequency comb and the local oscillator comb is such that each local oscillator mode overlaps with a different segment of the received spectrum of the received signal to define a series of comb pairs.

14. The receiver according to claim 11, wherein the detector comprises a subrate detector array that matches a native signal bandwidth (δf) of the received spread spectrum signal, such that the resulting array output is a discrete Fourier decomposition of a received field of the received spread spectrum signal.

15. A method for measuring timing difference between a receiver and a spread spectrum signal, the method comprising generating an optical signal frequency comb, modulating the optical signal frequency comb with a received spread spectrum signal, generating an optical local oscillator comb that is mutually coherent to the optical signal frequency comb, modulating each mode of the optical local oscillator comb with the Fourier terms of a codeword, combining the modulated combs and detecting the Fourier terms of the received spread spectrum signal from the combined combs using an array of detectors, measuring the phase shifts of the Fourier terms of the received spread spectrum signal, extracting the timing difference between the receiver and the received spread spectrum signal from the phase shifts of the Fourier terms of the received spread spectrum signal.

16. The method according to claim 15, wherein the timing difference between the receiver and the received spread spectrum signal is extracted by interpolating the phase shift of the Fourier terms of the received spread spectrum signal.

17. The method according to claim 15, wherein the timing difference between the receiver and the received spread spectrum signal is measured from a subset of Fourier terms of the received spread spectrum signal selected by a channel selection function.

18. The method according to claim 17, wherein the channel selection function is chosen by the ratio between the peak amplitude and the side-lobe amplitude of the time-domain equivalent of the channel selection function.

* * * * *